United States Patent
Aotani et al.

(10) Patent No.: US 10,014,113 B2
(45) Date of Patent: Jul. 3, 2018

(54) ELECTRONIC DEVICE SHEET HAVING INSULATION PATCH MEMBER ON DIELECTRIC LAYER

(71) Applicant: TDK CORPORATION, Tokyo (JP)

(72) Inventors: Junji Aotani, Tokyo (JP); Shigeaki Tanaka, Tokyo (JP); Yoshihiko Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/288,216

(22) Filed: Oct. 7, 2016

(65) Prior Publication Data

US 2017/0110250 A1 Apr. 20, 2017

(30) Foreign Application Priority Data

Oct. 15, 2015 (JP) ................. 2015-203877

(51) Int. Cl.
| | |
|---|---|
| *H01G 4/33* | (2006.01) |
| *H01G 4/005* | (2006.01) |
| *H01G 2/14* | (2006.01) |
| *H01G 4/12* | (2006.01) |

(52) U.S. Cl.
CPC ............... *H01G 4/33* (2013.01); *H01G 2/14* (2013.01); *H01G 4/005* (2013.01); *H01G 4/1227* (2013.01)

(58) Field of Classification Search
CPC ........ H01G 4/33; H01G 4/1227; H01G 4/005; H01G 2/14
See application file for complete search history.

(56) References Cited

U.S. PATENT DOCUMENTS

| | | | |
|---|---|---|---|
| 4,464,823 A | 8/1984 | Izu et al. | |
| 4,510,674 A | 4/1985 | Izu et al. | |
| 4,510,675 A | 4/1985 | Izu et al. | |
| 4,731,695 A * | 3/1988 | Brown | H01G 4/20 29/25.42 |
| 4,851,370 A * | 7/1989 | Doklan | H01L 21/0214 257/411 |
| 5,587,614 A | 12/1996 | Hwang et al. | |
| 5,854,499 A | 12/1998 | Nishioka | |
| 5,923,062 A | 7/1999 | Ohno | |
| 5,936,257 A | 8/1999 | Kusunoki et al. | |
| 5,970,337 A | 10/1999 | Nishioka | |
| 6,132,585 A | 10/2000 | Midorikawa et al. | |
| 6,166,424 A | 12/2000 | Mikawa et al. | |
| 6,207,522 B1 | 3/2001 | Hunt et al. | |

(Continued)

FOREIGN PATENT DOCUMENTS

| | | |
|---|---|---|
| JP | S61-64112 A | 4/1986 |
| JP | H06-112081 A | 4/1994 |

(Continued)

*Primary Examiner* — David M Sinclair
(74) *Attorney, Agent, or Firm* — Oliff PLC

(57) ABSTRACT

The electronic device sheet comprises a pair of electrode layers, a dielectric layer provided between the pair of electrode layers, and one or more insulation patch members provided on one of principal surfaces of the dielectric layer, wherein the number of the insulation patch members is 1 or more and 1000 or less per 1 $cm^2$ of the principal surface, and the total area of the insulation patch members is 10 $\mu m^2$ or larger and 3 $mm^2$ or smaller per 1 $cm^2$ of the principal surface.

3 Claims, 3 Drawing Sheets

(56) References Cited

U.S. PATENT DOCUMENTS

| | | |
|---|---|---|
| 6,270,835 B1 | 8/2001 | Hunt et al. |
| 6,288,890 B1 | 9/2001 | Saito et al. |
| 6,342,164 B1 * | 1/2002 | Beuhler ................ G03F 7/2002 |
| | | 216/106 |
| 6,430,028 B1 * | 8/2002 | Kar-Roy ................ H01L 28/40 |
| | | 257/E21.008 |
| 6,433,993 B1 | 8/2002 | Hunt et al. |
| 6,728,092 B2 | 4/2004 | Hunt et al. |
| 6,751,833 B2 | 6/2004 | Saito et al. |
| 7,319,081 B2 | 1/2008 | Sakashita et al. |
| 7,524,552 B2 | 4/2009 | Yokota et al. |
| 7,592,626 B2 | 9/2009 | Ozaki et al. |
| 2003/0045050 A1 * | 3/2003 | Moore ................ H01L 21/3144 |
| | | 438/239 |
| 2006/0098385 A1 | 5/2006 | Sakashita et al. |
| 2013/0244447 A1 * | 9/2013 | Minko ................ H01G 4/33 |
| | | 438/785 |

FOREIGN PATENT DOCUMENTS

| | | |
|---|---|---|
| JP | H08-78283 A | 3/1996 |
| JP | H10-27729 A | 1/1998 |
| JP | H10-247612 A | 9/1998 |
| JP | 2000-178793 A | 6/2000 |
| JP | 2001-356367 A | 12/2001 |
| JP | 2002-026266 A | 1/2002 |
| JP | 2002-043517 A | 2/2002 |
| JP | 2002-110468 A | 4/2002 |
| JP | 2002-185148 A | 6/2002 |
| JP | 2002-231574 A | 8/2002 |
| JP | 2003-011270 A | 1/2003 |
| JP | 2004-165596 A | 6/2004 |
| JP | 2005-101348 A | 4/2005 |

* cited by examiner

ELECTRONIC DEVICE SHEET HAVING INSULATION PATCH MEMBER ON DIELECTRIC LAYER

TECHNICAL FIELD

The present invention relates to an electronic device sheet.

BACKGROUND

In recent years, in various electronic devices, spaces for installing electronic components have tended to be reduced. Thus, an electronic device sheet including a capacitor has a demand for a reduction in profile. For the reduction of an electronic device sheet in profile, it is effective to reduce the thicknesses of a dielectric layer. As one of the techniques therefor, there is a known method of manufacturing an electronic device sheet of a capacitor or the like by forming a thin dielectric layer on an electrode layer using a thin film forming technology such as a sputtering method. However, thinning a dielectric layer tends to lead to reductions in withstanding voltage and leakage properties of the dielectric layer. For this reason, techniques for improving the withstanding voltage and the leakage properties in accordance with thinning a dielectric layer are under study. For example, Patent Literature 1 discloses a technique that optimizes a material, a crystalline structure, and an orientation with respect to the surface of a substrate, of a dielectric layer in an electronic device sheet, so as to improve the leakage properties and the withstanding voltage of the dielectric layer.

CITATION LIST

Patent Literature

Patent Literature 1: Japanese Unexamined Patent Publication No. 2004-165596

SUMMARY

By prior art represented by Patent Literature 1, a dielectric element is manufactured that is low in leakage current in a thin dielectric layer and high in withstanding voltage. However, a dielectric layer (dielectric material) of a capacitor has piezoelectric properties, and thus mechanical deformation due to an inverse piezoelectric effect repeatedly occurs in the dielectric layer through the use of an element. The present inventor found, through a long-teen reliability test on a conventional electronic device sheet sample, that when a dielectric layer suffers mechanical deformation repeatedly for a long time, mechanical stress accumulates in the dielectric layer, and this stress becomes a cause of dielectric breakdown of the dielectric layer in the long run.

The present invention is made in view of the above-described finding and has an objective to provide an electronic device sheet that suppresses dielectric breakdown due to a mechanical stress and has an excellent durability.

An electronic device sheet according to the present invention comprises a pair of electrode layers, a dielectric layer provided between the pair of electrode layers, and one or more insulation patch members provided on one of the principal surfaces of the dielectric layer, wherein the number of the insulation patch members is 1 or more and 1000 or less per 1 $cm^2$ of the principal surface, and the total area of the insulation patch members is 10 $\mu m^2$ or larger and 3 $mm^2$ or smaller per 1 $cm^2$ of the principal surface.

It is preferable that the dielectric layer include a nucleus portion, and the nucleus portion be covered with the insulation patch member.

It is preferable that the nucleus portion be a recessed portion or a projecting portion on a surface of the dielectric layer, or a hole penetrating the dielectric layer.

It is preferable that the electronic device sheet include two or more of the insulation patch members on the principal surface, and a closest distance between the insulation patch members be 100 μm or longer and 5 mm or shorter.

The electronic device sheet according to the present invention suppresses dielectric breakdown due to a mechanical stress and has an excellent durability. Thus, the properties of the electronic device sheet can be maintained for a long time.

DETAILED DESCRIPTION

Hereafter, a preferred embodiment of the present invention will be described with reference to the drawings, but the present invention is not limited to the following embodiment. Note that identical or equivalent elements will be denoted by the same reference symbols and the description thereof will be omitted if it is redundant.

Figure 1:
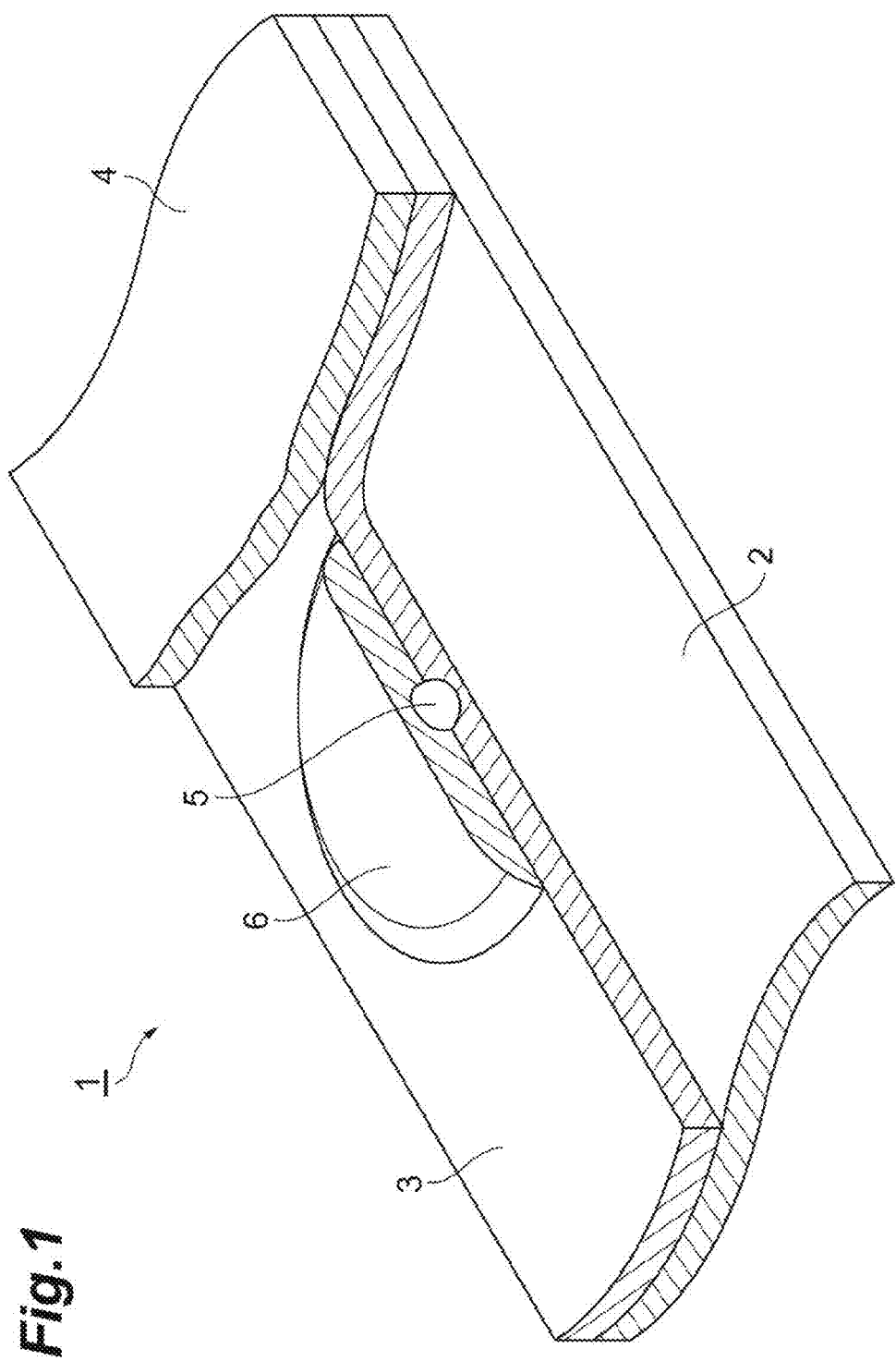
FIG. 1 is a perspective cross-sectional view schematically illustrating an electronic device sheet in an embodiment of the present invention.

FIG. 1 is a perspective cross-sectional view schematically illustrating an electronic device sheet in an embodiment of the present invention. An electronic device sheet 1 includes a lower part electrode layer 2, an upper part electrode layer 4, a dielectric layer 3 formed between the lower part electrode layer 2 and the upper part electrode layer 4, and one or more insulation patch members 6 provided on one of the principal surfaces of the dielectric layer 3. Hereafter, the lower part electrode layer 2 and the upper part electrode layer 4 will also be collectively referred to as a pair of electrode layers. Note that the terms "upper part" and "lower part" for the electrode layers merely denote relative-position relations with the dielectric layer 3 in a direction. Therefore, the present embodiment also includes a mode in which the upper part electrode layer 4 in the present embodiment is positioned at the lower part of an actual product, and the lower part electrode layer 2 in the present embodiment is positioned at the upper part of the actual product. In addition, the principal surfaces of the dielectric layer 3 refer to a pair of opposed surfaces having the largest area in the dielectric layer.

The electronic device sheet in the present embodiment includes a plurality of modes including a thin film capacitor, such as a sheet electronic device that is made into an inductor by patterning an upper part electrode layer or a lower part electrode layer of a thin film capacitor into a spiral shape, a sheet electronic device that is made into a resistance element by forming an upper part electrode layer or a lower part electrode layer of a thin film capacitor into a line shape, a sheet electronic device in which an upper part electrode layer or a lower part electrode layer of a thin film capacitor is made into a specific line shape, and a sheet electronic device that is made into an electronic band gap (EBG) element by patterning a dielectric film in a periodic manner.

The insulation patch member 6 can function as a central part to control (leak or adjust) a charge and a stress accumulating in the dielectric layer 3. In the electronic device sheet, mechanical stress accumulates in the dielectric layer 3 through use. Where stress accumulates, a charge tends to accumulate locally because structural strain develops in the dielectric layer 3. When the accumulating charge exceeds a retention limit to be rapidly released, dielectric breakdown may be brought about to the dielectric layer 3. Although the reason that the electronic device sheet 1 in the present embodiment suppresses dielectric breakdown due to a mechanical stress is not entirely explained clearly, the present inventors consider as follows. Ex-post charges accumulating in the dielectric layer 3 due to mechanical stresses are first concentrated on the insulation patch members 6. The charges concentrated on the insulation patch members 6 are propagated along the interface between the insulation patch member 6 and the dielectric layer 3 to be gradually released in the form of interfacial current reaching electrode layers. As seen from the above, it is considered that the accumulating charges are not released rapidly even when local accumulation of charges develops in the dielectric layer 3 due to mechanical stresses, which will not cause dielectric breakdown to occur in the dielectric layer.

The number of the insulation patch members 6 is 1 or more and 1000 or less per 1 $cm^2$ of one of the principal surfaces of the dielectric layer 3. The above number of the insulation patch members 6 may be calculated based on the number of the insulation patch members 6 existing on one of the principal surfaces of the dielectric layer 3, in the form of the average value of the numbers of the insulation patch members 6 per 1 $cm^2$ of the above principal surface. In the case where the number of the insulation patch members 6 is not more than one per 1 $cm^2$ of the principal surface, the distance between the nearest insulation patch members 6 becomes too long, which makes it difficult to perform collaborative action between the insulation patch members 6. Here, the term "collaborative action between the insulation patch members 6" refers to action in which, when a plurality of insulation patch members 6 are adjacent to one another, a charge accumulating in an insulation patch member 6 is propagated to other insulation patch members 6 to be dispersed into a plurality of insulation patch members 6, so that the charge is released without breaking the dielectric layer 3. Since the action is suppressed, a charge due to a stress is prone to be concentrated on a single insulation patch member 6, and the concentrated charge is emitted at once, whereby dielectric breakdown is prone to occur. On the other hand, in the case where the number of the insulation patch members 6 is not less than 1000 per 1 $cm^2$ of the principal surface, through the use of the electronic device sheet for a long time, charges are concentrated on a large number of the insulation patch members 6, resulting in large energy accumulating in the electronic device sheet. As a result, the release of the charges occurs from the large number of insulation patch members 6 simultaneously, which causes a large current to flow, leading to dielectric breakdown of the electronic device sheet. The number of the insulation patch members 6 can be obtained by, for example, magnifying the dielectric layer 3 with an image recognition apparatus, under a metallurgical microscope, or the like, and by counting the number of the insulation patch members 6 per unit area. In this case, the insulation patch members 6 may be recognized based on contrast differences in an image that is captured into the image recognition apparatus. From the viewpoint of improving the durability of the electronic device sheet 1, it is preferable that the number of the insulation patch members 6 be 2 or more and 1000 or less per 1 $cm^2$ of one of the principal surfaces of the dielectric layer 3, more preferably 10 or more and 300 or less, still more preferably 20 or more and 100 or less.

The total area of the insulation patch members 6 is 10 $\mu m^2$ or larger and 3 $mm^2$ (3000000 $\mu m^2$) or smaller per 1 $cm^2$ of one of the principal surfaces of the dielectric layer 3. Here, the term "area of the insulation patch member 6" refers to the area of a plane figure obtained by projecting the insulation patch member 6 on a plane parallel to the principal surface of the dielectric layer 3. Examples of a method of measuring the area of the insulation patch member 6 include one that performs image recognition on contrast differences in an enlarged photograph under a scanning electron microscope (SEM) with software and calculates the area of the portion inside the contour of the insulation patch member 6. The above total area of the insulation patch members 6 may be calculated based on the total area of the insulation patch members 6 existing on one of the principal surfaces of the dielectric layer 3, in the form of the average value of the total area of the insulation patch members 6 per 1 $cm^2$ of the above principal surface. A charge accumulating in the outermost portion of the insulation patch member 6 can basically move in the direction of the interface between the insulation patch member 6 and the dielectric layer. Here, the term "outermost portion of the insulation patch member 6" refers to the boundary between the insulation patch member 6 and the dielectric layer 3 formed by the continuation of edges, of the insulation patch member 6 in the observation of the cross sections of the insulation patch member 6 and the dielectric layer 3, in the observation in the direction of laminating the insulation patch member 6 and the dielectric layer 3. The present inventors conducted studies on the electric resistances of these through simulations and experiments. In the case where the total area of the insulation patch members 6 per 1 $cm^2$ of one of the principal surfaces of the dielectric layer 3 is not less than 3 $mm^2$, the probability of the occurrence of a short circuit or a leakage current in the electronic device sheet 1 increases. A larger insulation patch member 6 makes a movement distance along the interface with dielectric layer 3 longer along which a charge accumulating in the outermost portion of the insulation patch member 6 moves toward the center of the insulation patch member 6. This also means that the electric resistance of the interface is increased. According to the result of the simulations conducted by the present inventors, the electric resistance of the interface in the case of the total area of the insulation patch members 6 exceeding 3 $mm^2$ tends to exceed the electric resistance of the dielectric layer 3 in the thickness direction assuming a thickness (about 0.01 to 0.1 mm) normally used for a thin film capacitor. As seen from the above results, it is considered that current flows in the thickness direction of the dielectric layer 3 in which the electric resistance is relatively low. On the other hand, in the case where the total area of the insulation patch members 6 falls below 10 $\mu m^2$ per 1 $cm^2$ of one of the principal surfaces of the dielectric layer 3, the probability of the occurrence of a short circuit or a leakage current in the electronic device sheet 1 increases. As the cause of this, it can be considered that the consumption of charges is insufficient in the planar direction of the dielectric layer 3, and unconsumed charges attempt to flow in the direction of the thickness of the dielectric layer 3. From the viewpoint of improving the durability of the electronic device sheet 1, it is preferable that the total area of the insulation patch members 6 be 1000 $\mu m^2$ or larger and 100000 $\mu m^2$ or smaller per 1 $cm^2$ of one of the principal surfaces of the dielectric layer 3, more preferably 2000 $\mu m^2$ or larger and 10000 $\mu m^2$ or smaller.

In the dielectric layer 3, a nucleus portion 5 may exist. It is preferable that the nucleus portion 5 be covered with the insulation patch member 6. The nucleus portion 5 is constituted by, for example, a recessed portion or a projecting portion on the surface of the dielectric layer 3, a hole penetrating the dielectric layer 3, or the like. The shape of the above recessed portion or the hole on the dielectric layer surface is not limited in particular, and the shape may be linear, round shape, islands shape, or the other shapes. The projecting portion may be a protuberance portion of the dielectric layer 3 itself, the protuberance portion being formed by other dielectric particles embedded in the dielectric layer 3. A crack is classified as a recessed portion when not penetrating the dielectric layer 3, or classified as a hole when penetrating the dielectric layer 3. When the nucleus portion 5 is covered with the insulation patch member 6, the insulation patch member 6 is fixed by the dielectric layer more stably, which enables more stable emission of a concentrated charge, resulting in an improved durability. In addition, in the case of forming the insulation patch member 6 in an electrophoresis manner, the above nucleus portion 5 can serve as the start point of forming the insulation patch member 6 or means for retaining the insulation patch member 6.

In the case where the electronic device sheet 1 includes two or more insulation patch members 6 on the principal surface of the dielectric layer 3, a closest distance between the insulation patch members can be set at 100 $\mu m$ or longer and 5 mm or shorter. Here, the term "closest distance" herein refers to the shortest distance between the boundary lines of two insulation patch members. In addition, in the case where the electronic device sheet 1 includes three or more insulation patch members 6 on the principal surface of the dielectric layer 3, the term "closest distance" refers to the closest distance between two insulation patch members that have the shortest closest distance. When the above closest distance falls within the range between the above numerical values, insulation patch members 6 are allowed to easily exert the previously described collaborative action, so that it is possible to improve the durability of the electronic device sheet 1.

It is preferable that the average area per one insulation patch member 6 be 10 to 1200000 $\mu m^2$ from the viewpoint of improving the durability of the electronic device sheet. The average area per one insulation patch member 6 can be calculated by dividing the total area of insulation patch members in one of the principal surfaces of the dielectric layer 3 by the number of the insulation patch members.

As the material of the lower part electrode layer 2 in the present embodiment, well-known conductive materials can be selected as appropriate. The well-known conductive materials refer to, for example, metals, metallic oxides, conductive organic materials, and the like. In particular, the lower part electrode layer 2 desirably has a low electric resistance and a high mechanical strength, and thus metallic materials can also be used therefor. Above all, Ni and Cu are preferable because they have low electric resistances and are relatively sturdy metallic materials. In particular, in terms of the viewpoint of high-temperature load reliability and moisture-proof load reliability, the material of the lower part electrode layer 2 may be a conductive body containing at least Ni. Examples of the conductive body containing Ni include a pure Ni (99.9% or more of Ni) or a Ni-based alloy.

The Ni-based alloy may contain, for example, a noble metal element such as Pt, Pd, Ir, Ru, and Rh, and the content of the noble metal element can be set at 50 mass % or less with respect to the entire mass of the alloy. Within such a range of content, the high-temperature load reliability and the moisture-proof load reliability of the electronic device sheet 1 equivalent to the case of using a pure Ni tends to be obtained.

The mode of the lower part electrode layer 2 in the present embodiment can be selected from various modes including a conductivity foil containing a metal, a sintered body containing a metal, an electrode substrate in which a conductive thin film of any kind is formed on the substrate, and the like. The lower part electrode layer 2 may be a Ni foil consisting of a metal polycrystal in particular. By making the lower part electrode layer 2 into the metallic foil, it is possible to reduce the difference in thermal expansion coefficient from the dielectric layer 3 and to suppress a reduction in capacitance of the electronic device sheet 1. It is desirable that as the substrate of the electrode substrate, a material of a thermal expansion coefficient having a small difference from that of the dielectric layer 3 be selected, and examples of the substrate include a Si substrate and a ceramic substrate (not illustrated). Examples of the conductive thin film include a Ni thin film formed by sputtering, vapor deposition, or the like. As the electrode substrate, for example, a Si substrate with a Ni thin film, a ceramic substrate with a Ni thin film, or the like can be used. It is thereby possible to suppress a reduction in capacitance of the electronic device sheet 1 due to the difference in thermal expansion coefficient between the lower part electrode layer 2 and the dielectric layer 3.

Furthermore, the mode of the lower part electrode layer 2 in the present embodiment may be a mode in which a different conductive material is interposed between the lower part electrode layer 2 and the dielectric layer 3. Alternatively, the lower part electrode layer 2 may have a multi-layered electrode structure. The multi-layered electrode structure can be a multi-layered electrode in which Ni electrode layers are disposed on the side of a surface facing the dielectric layer 3. Such a multi-layered electrode may have, for example, a structure in which Ni electrode layers are formed and laminated on a Cu foil by sputtering, vapor deposition, or the like. In the case where a Ni electrode layer is in contact with the dielectric layer 3, the high-temperature load reliability and the moisture-proof load reliability of the electronic device sheet 1 are enhanced.

The material of the dielectric layer 3 in the present embodiment can be a perovskite oxide dielectric, which has a high relative permittivity. Of perovskite dielectrics, a $BaTiO_3$-based dielectric without lead (Pb) is preferable in terms of environmental preservation viewpoint. In the case of a $BaTiO_3$-based dielectric, a $BaTiO_3$-based dielectric in which a part of a Ba site is substituted with an alkaline earth such as Ca and Sr may be used. In addition, a $BaTiO_3$-based dielectric in which a part of Ti site is substituted with an element such as Zr, Sn, and Hf may be used. Furthermore, a rare-earth element, or Mn, V, Nb, Ta, or the like may be added to the perovskite oxide dielectric.

As a method of forming the dielectric layer 3 in the present embodiment, a method normally used to form a thin film can be used. Examples of such method include the application of a solution by metal organic decomposition (MOD) or the like, sputtering, vapor deposition, pulse laser deposition (PLD), chemical vapor deposition (CVD), or the like.

The structure of the dielectric layer 3 in the present embodiment can be a thin film having a film thickness of 1000 nm or less. A dielectric layer 3 having a film thickness of 1000 nm or less allows the suppression of a reduction in capacitance value per unit area, which is preferable. In addition, the lower limit of the film thickness is not limited in particular, but it is preferable that the lower limit be 50 nm or more from the viewpoint of keeping the insulation resistance value of the dielectric layer 3 high. In view of the above relationship between the insulation resistance value and the capacitance, it is considered that a preferable range of the film thickness of the dielectric layer 3 in the electronic device sheet 1 is from 250 nm to 1000 nm. In addition, the crystalline structure of the dielectric layer 3 can be polycrystal.

The nucleus portion 5 in the present embodiment may be formed by irradiating the dielectric layer 3 after being deposited with an electromagnetic wave such as a laser beam. Alternatively, the nucleus portion 5 may be physically formed by the collision of hard ceramic powder or the like. The nucleus portion 5 may be formed by adhering particles to a charged region of the dielectric layer 3. For example, the nucleus portion 5 may be formed by bringing the particles and a sample on which the dielectric layer 3 is formed in a proper container and into contact with each other. This contact may be performed in a gas flux in which the particles are sprayed and caused to flow in a gas, or may be performed in a cistern in which the particles are dispersed in a pure water or an organic solvent. In addition, the particles may be retained during the deposition process of the dielectric layer 3 and adhered to the dielectric layer 3.

In the present embodiment, the insulation patch members 6 are formed after the dielectric layer 3 is formed. Before the formation of the insulation patch members 6, surface treatment, physical cleaning, or the like may be performed on the surface of the dielectric layer 3. Examples of the surface treatment include etching using an acid or an alkali, etching using plasma, and the like. Examples of the physical cleaning include ultrasonic cleaning, polishing, and the like. Through these processes, the state of the interface between the dielectric layer 3 and the insulation patch member 6 is made preferable, which stabilizes electric properties for a longer time.

Figure 2:
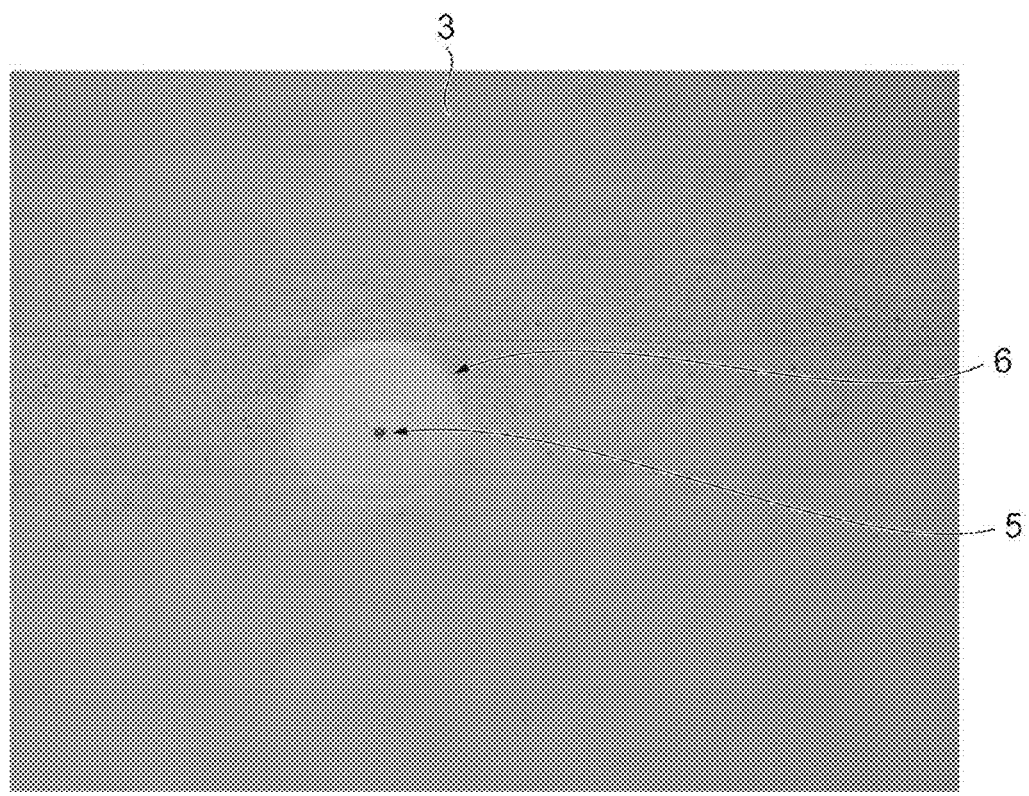
FIG. 2 is an observed image of an insulation patch member in the embodiment according to the present invention under an optical microscope.

FIG. 2 is an observation image of the insulation patch member 6 in the present embodiment taken under an optical microscope. In this observation example, the area of the insulation patch member 6 was measured 10000 $\mu m^2$.

The material of the insulation patch member 6 in the present embodiment is not limited in particular as long as the material is an insulator, and may be any of organic materials and inorganic materials. One of these materials may be used alone, or two or more kinds of these materials may be used in combination. Examples of the organic materials include an acrylic resin, an epoxy resin, a fluororesin, a urethane resin, an amide resin, a phenolic resin, polyetheretherketone (PEEK) resin, a polycarbonate resin, a polybutadiene resin, a polyimide resin, and the like. Examples of the inorganic materials include alumina, a silicon oxide, a barium titanate, a strontium titanate, a calcium titanate, and the like.

As an example of a method of forming the insulation patch members 6, a method of forming insulation patch members 6 containing inorganic ceramic particles will be described below specifically. In this example, a dispersion liquid in which the inorganic ceramic fine particles are dispersed in an organic solvent is used as a discharging solution. As the inorganic ceramic, alumina, a silicon oxide, a barium titanate, a strontium titanate, a calcium titanate, or the like is used. The particle sizes of inorganic ceramic fine particles may be set, for example, within a range of 3 nm to 20 nm. In addition, the content of the inorganic ceramic fine particles in the discharging solution may be set, for example, within a range of 0.1 mass % or more and 30 mass % or less. Examples of the organic solvent include xylene, isopropyl alcohol, acetone, and the like. The above dispersion liquid may be a high-viscosity solution with a suitable resin material added thereto so as to facilitate discharging in a discharging device. Examples of the resin material include high-resistance resin materials such as an acrylic resin, an epoxy resin, a fluororesin, a urethane resin, an amide resin, a phenolic resin, a polyetheretherketone (PEEK) resin, a polycarbonate resin, a polybutadiene resin, and a polyimide resin. From a coating of such a high-viscosity solution, it is possible to form the insulation patch member 6 containing a resin and dielectric ceramic particles dispersed in the resin.

Besides the adjustment of the content of the inorganic ceramic fine particles in a solution as described above, a proper amount of dispersant may be added to the solution. As such a dispersant, a well-known surfactant can be used as appropriate. In particular, alkyl glucoside, polyethylene glycol, and fatty acid sodium, which are surfactants, can be used. Alternatively, a monomer of dielectric ceramic fine particles may be dispersed by ultrasonic agitation.

Figure 3:
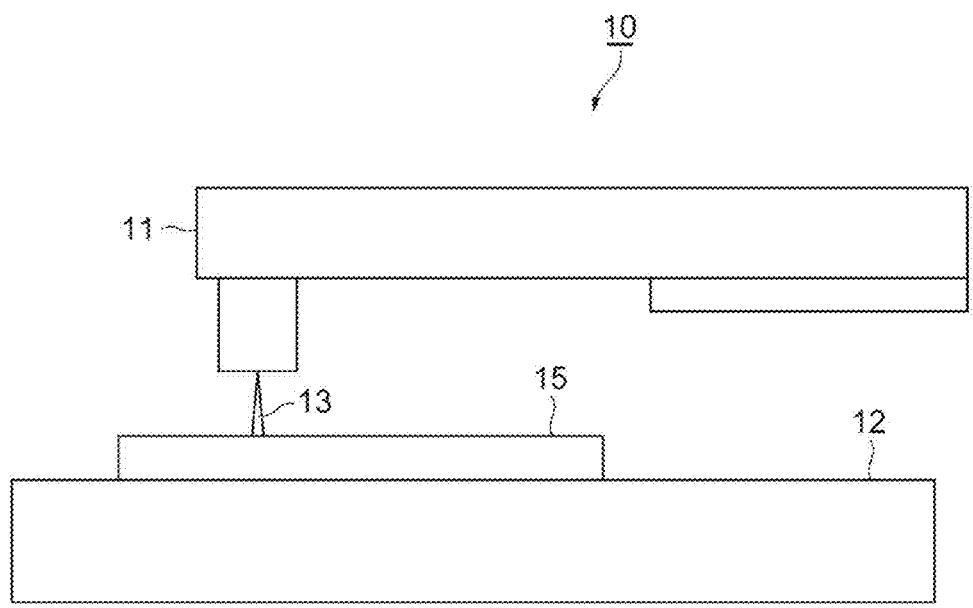
FIG. 3 is a schematic diagram of a discharging device in the embodiment according to the present invention.

As an example of a method of forming the insulation patch members 6 in the present embodiment, a method using a discharging device is cited. FIG. 3 is a schematic diagram illustrating an example of a discharging device in the present embodiment. As illustrated in FIG. 3, a discharging device 10 includes a stage 12, a laminated body 15 placed on the stage 12, a spraying unit 11 configured to discharge discharging solution 13 to form the insulation patch members 6 on the laminated body 15. The laminated body 15 is made by forming the dielectric layer 3 on the lower part electrode layer 2 previously described.

With the discharging device 10, the discharging solution 13 is discharged from the spraying unit 11 onto the principal surface of the dielectric layer 3 placed on the stage 12 so that the number of the insulation patch members 6 per 1 $cm^2$ of one of the principal surfaces of the dielectric layer 3 becomes 1 or more and 1000 or less, and the total area of the insulation patch members 6 becomes 10 $\mu m^2$ or larger and 3 $mm^2$ or smaller. In the case where the nucleus portion 5 exists on the principal surface of the dielectric layer 3, it is preferable to discharge the discharging solution aiming at the nucleus portion 5. Alternatively, the discharging solution can be discharged in spray and adhered, with a predetermined interval set in the discharging device 10. The total area of the insulation patch members 6 per 1 $cm^2$ of one of the principal surfaces of the dielectric layer 3 can be adjusted by controlling the amount of discharge. For example, by discharging the discharging solution in spray with the predetermined interval set to control the number of the insulation patch members 6 per 1 $cm^2$ of one of the principal surfaces of the dielectric layer 3 to 1 or more and 1000 or less, and by controlling the amount of discharge so that the average area per one insulation patch member becomes 2 $\mu m^2$ to 5000 $\mu m^2$, it is possible to adjust the total area of the insulation patch members 6 per 1 $cm^2$ of one of the principal surfaces of the dielectric layer 3 within a range of 10 $\mu m^2$ or larger and 3 $mm^2$ or smaller.

By performing heat treatment on the discharging solution adhered onto the principal surface of the dielectric layer 3, it is possible to remove the solvent and crystallize inorganic ceramic fine particle, so as to form the insulation patch members 6. The crystallization may be performed by subjecting the adhered discharging solution to calcination treatment at a temperature of 500° C. or higher. It is thereby also possible to increase the relative permittivity of the insulation patch members 6. The crystalline state of the insulation patch members 6 can be confirmed through observation under a TEM, or cross section observation using a FIB-SIM. The measurement of the electric properties of the insulation patch members 6 can be performed through image recognition using a current-detection atomic force microscope (AFM) with a microprobe.

The insulation patch member 6 can also be formed by an electrophoresis method using a water-soluble solution containing dielectric ceramic particles that were made to have ionicity, starting from the nucleus portion 5 or an artificial pinhole as a start point.

The insulation patch members 6 can be formed by a mask sputtering method. In the mask sputtering method, a mask provided at certain portions with fine openings is used so that the number of the insulation patch members 6 per 1 cm$^2$ of one of the principal surfaces of the dielectric layer 3 becomes 1 or more and 1000 or less, and the total area of the insulation patch members 6 becomes 10 μm$^2$ or larger and 3 mm$^2$ or smaller. Then, sputtering deposition is performed using an insulator as a target. Examples of the target include a target containing alumina, a silicon oxide, a barium titanate, a strontium titanate, a calcium titanate, or the like.

In the case where the nucleus portion 5 exists on one of the principal surfaces of the dielectric layer 3, the insulation patch member 6 can be formed on the nucleus portion 5 by identifying the position of the nucleus portion 5 by a method such as image recognition and depositing an insulator to the position. For example, by an inkjet method, the insulator can be printed into a pattern including the position of the nucleus portion 5. Alternatively, the insulator may be deposited to the identified position of the nucleus portion 5 by a focused ion beam system. In the case of the mask sputtering method, the sputtering may be performed by disposing a mask based on a recognized image so that an opening of the mask fits the nucleus portion.

In the electronic device sheet 1 in the present embodiment, the upper part electrode layer 4 is formed after the insulation patch member 6 is formed. As the material of the upper part electrode layer 4 in the present embodiment, well-known conductive materials can be selected as appropriate. The well-known conductive materials refer to, for example, metals, metallic oxides, conductive organic materials, and the like, from which the conductive materials can be selected as appropriate. In particular, the upper part electrode layer 4 can have a low electric resistance and a high mechanical strength. For this reason, it is possible to use metals. Above all, Ni and Cu are preferable because they have low electric resistances and are relatively sturdy metallic materials. The upper part electrode layer 4 may be a single layer consisting of a Ni electrode layer or a Cu electrode layer, and may be a double-layer structure consisting of a Ni electrode layer and a Cu electrode layer. Between the upper part electrode layer 4 and the dielectric layer 3 or the insulation patch member 6, a different conductive material may be interposed. In the case where the upper part electrode layer 4 includes a Ni electrode layer, the Ni electrode layer side of the upper part electrode layer 4 can be brought into contact with the dielectric layer 3. In the case of using a Ni electrode layer for the whole or a part of the upper portion electrode layer 4, a pure Ni or a Ni-based alloy can be used as with the lower part electrode layer 2. In the case of the Ni-based alloy, it is desirable that the alloy contain, for example, a noble metal element such as Pt, Pd, Ir, Ru, and Rh, and the content of the noble metal element be set at 50 mass % or less with respect to the entire mass of the alloy. Furthermore, it is preferable that the thickness of the upper part electrode layer 4 be within a range from 0.1 μm and 2.0 μm.

On the Ni electrode layer in the present embodiment, a Cu electrode layer may be formed. The Cu electrode layer herein can be a pure Cu (99.9% or more of Cu), or a Cu-based alloy. In the case of the alloy, the alloy may contain, for example, a noble metal element such as Pt, Pd, Ir, Ru, and Rh, and the content of the noble metal element may be set at 50 mass % or less with respect to the entire mass of the alloy. Cu has a feature that it has a resistivity equivalent to those of Au and Ag and is convenient for industrial use. For this reason, Cu is used for lines in electronic devices in many cases. Using Cu for the upper part electrode layer 4 of the electronic device sheet 1 has an effect of reducing an equivalent series resistance (ESR) because of its relatively small resistivity.

The upper part electrode layer 4 can be formed by a method normally used to form a thin film. As such a method, for example, the application of a solution, sputtering, vapor deposition, PLD, CVD, or the like can be used as appropriate.

Hereinafter, the present invention will be specifically described by way of Examples. Note that the present invention is not limited to the following Examples.

EXAMPLES

Example 1

A dielectric layer (BaTiO$_3$-based dielectric) was formed by a sputtering method with a thickness of 800 nm on a Ni foil having a size of 100 mm×100 mm. Annealing was thereafter performed on the Ni foil on which the dielectric layer was deposited, so that the dielectric layer on the Ni foil was crystallized, whereby a laminated body was obtained. As pretreatment to form insulation patch members, foreign objects and the like were removed from the dielectric layer of the laminated body by ultrasonic cleaning. Next, to form a nucleus portion on the dielectric layer, a dispersion liquid was prepared by dispersing the alumina particles having an average grain diameter of 0.25 μm in isopropyl alcohol (IPA). The dispersion liquid was discharged onto the dielectric layer by an inkjet method. The IPA was thereafter made evaporated, whereby the laminated body was obtained on the surface of the dielectric, the laminated body having a protruding portion made of the alumina particles (a recessed portion in the dielectric layer formed by collision with the alumina particles, as the nucleus portion).

An epoxy resin was dissolved in xylene so that the concentration of the epoxy resin becomes 30%, whereby a high-viscosity solution to form insulation patch members made of the epoxy resin was prepared. By a discharging device, the high-viscosity solution was discharged in spray, targeting the nucleus portion 5 in the dielectric layer of the laminated body, so as to be adhered onto the dielectric layer. The laminated body with the high-viscosity solution adhered thereto was subjected to heat treatment in the air at 200° C. to be dried, whereby insulation patch members were formed on a principal surface of the dielectric layer. The number of the insulation patch members per 1 cm$^2$ of the principal surface of the dielectric layer was five, the total area of the insulation patch members was 120 and the closest distance between insulation patch members was 5000 μm.

On the dielectric layer of the laminated body on which the insulation patch member was formed, a seed layer was formed by sputtering, and thereafter a Cu film was formed by electrolytic plating, whereby an upper part electrode layer (Cu electrode layer) was formed. Next, patterning was performed on the upper part electrode layer to form a capacitor element portion having a size of 10 mm×10 mm. Thereafter, for particle growth in the Cu electrode layer, annealing was performed on the laminated body on which the upper part electrode layer is formed, in vacuum at 340° C., whereby an electronic device sheet was obtained. The obtained electronic device sheet was divided into 100 electronic device sheet elements having a size of 10 mm×10 mm. A reliability test described below was conducted on the obtained electronic device sheet elements to evaluate the aged deterioration in capacitance value and insulation resistance value.

The reliability test was conducted in such a manner as to continuously apply a 5 VAC signal (1 kHz) to the 100 electronic device sheet elements enclosed in a hermetically-sealed atmospheric-pressure container maintained at a temperature of 85 degrees and a humidity of 85%, and measure the capacitance values and the insulation resistance values of the 100 electronic device sheet elements after 200 hours, 400 hours, and 600 hours. The capacitance values were measured at 1 kHz, 1 Vrms with an LCR Meter 4284A (Agilent Technologies) that was placed outside the hermetically-sealed atmospheric-pressure container. The insulation resistance values were measured under a condition of 4 VDC with a High-Resistance Meter 4339B (Agilent Technologies) that was placed outside the hermetically-sealed atmospheric-pressure container. The determination of aged deterioration was made by calculating a property preservation ratio from the number of electronic device sheet elements that satisfied reference values, a capacitance value of $2.5 \times 10^{-7}$ F or greater and an insulation resistance value of $5 \times 10^{+8} \Omega$ or greater that were selected from among typical specifications of an electronic device sheet. As a result, in the present example, conforming items were obtained at 92% (92/100 pcs) after 600 hours.

Example 2

An electronic device sheet was manufactured by the same manufacturing method as in Example 1 except that the number of insulation patch members per 1 cm² of the principal surface of the dielectric layer was set at 10, the total area of the insulation patch members was set at 1000 µm², and the closest distance between insulation patch members was set at 4000 µm. The measurement of the capacitance values and the insulation resistance values and the evaluation of aged deterioration were performed on electronic device sheet elements under the same evaluation conditions as in Example 1. As a result, conforming items were obtained at 93% (93/100 pcs) after 600 hours.

Example 3

An electronic device sheet was manufactured by the same manufacturing method as in Example 1 except that the number of insulation patch members per 1 cm² of the principal surface of the dielectric layer was set at 30, the total area of the insulation patch members was set at 3000 µm², and the closest distance between insulation patch members was set at 3000 µm. The measurement of the capacitance values and the insulation resistance values and the evaluation of aged deterioration were performed on electronic device sheet elements under the same evaluation conditions as in Example 1. As a result, conforming items were obtained at 97% (97/100 pcs) after 600 hours.

Example 4

An electronic device sheet was manufactured by the same manufacturing method as in Example 1 except that the number of insulation patch members per 1 cm² of the principal surface of the dielectric layer was set at 60, the total area of the insulation patch members was set at 5000 µm², and the closest distance between insulation patch members was set at 2500 µm. The measurement of the capacitance values and the insulation resistance values and the evaluation of aged deterioration were performed on electronic device sheet elements under the same evaluation conditions as in Example 1. As a result, conforming items were obtained at 99% (99/100 pcs) after 600 hours.

Example 5

An electronic device sheet was manufactured by the same manufacturing method as in Example 1 except that the number of insulation patch members per 1 cm² of the principal surface of the dielectric layer was set at 100, the total area of the insulation patch members was set at 10000 µm², and the closest distance between insulation patch members was set at 2000 µm. The measurement of the capacitance values and the insulation resistance values and the evaluation of aged deterioration were performed on electronic device sheet elements under the same evaluation conditions as in Example 1. As a result, conforming items were obtained at 96% (96/100 pcs) after 600 hours.

Example 6

An electronic device sheet was manufactured by the same manufacturing method as in Example 1 except that the number of insulation patch members per 1 cm² of the principal surface of the dielectric layer was set at 200, the total area of the insulation patch members was set at 20000 µm², and the closest distance between insulation patch members was set at 1500 µm. The measurement of the capacitance values and the insulation resistance values and the evaluation of aged deterioration were performed on electronic device sheet elements under the same evaluation conditions as in Example 1. As a result, conforming items were obtained at 93% (93/100 pcs) after 600 hours.

Example 7

An electronic device sheet was manufactured by the same manufacturing method as in Example 1 except that the number of insulation patch members per 1 cm² of the principal surface of the dielectric layer was set at 300, the total area of the insulation patch members was set at 100000 µm², the closest distance between insulation patch members was set at 1000 µm, and insulation patch members were formed by the mask sputtering method. The measurement of the capacitance values and the insulation resistance values and the evaluation of aged deterioration were performed on electronic device sheet elements under the same evaluation conditions as in Example 1. As a result, conforming items were obtained at 94% (94/100 pcs) after 600 hours. The conditions of the mask sputtering were such that silicon oxide was used as a target, and a radio frequency of 13.56 MHz was applied from a power supply.

Example 8

An electronic device sheet was manufactured by the same manufacturing method as in Example 7 except that the number of insulation patch members per 1 cm$^2$ of the principal surface of the dielectric layer was set at 500, the total area of the insulation patch members was set at 500000 µm$^2$, and the closest distance between insulation patch members was set at 500 µm. The measurement of the capacitance values and the insulation resistance values and the evaluation of aged deterioration were performed on electronic device sheet elements under the same evaluation conditions as in Example 1. As a result, conforming items were obtained at 91% (91/100 pcs) after 600 hours.

Example 9

An electronic device sheet was manufactured by the same manufacturing method as in Example 7 except that the number of insulation patch members per 1 cm$^2$ of the principal surface of the dielectric layer was set at 1000, the total area of the insulation patch members was set at 800000 µm$^2$, and the closest distance between insulation patch members was set at 150 µm. The measurement of the capacitance values and the insulation resistance values and the evaluation of aged deterioration were performed on electronic device sheet elements under the same evaluation conditions as in Example 1. As a result, conforming items were obtained at 90% (90/100 pcs) after 600 hours.

Example 10

An electronic device sheet was manufactured by the same manufacturing method as in Example 7 except that the number of insulation patch members per 1 cm$^2$ of the principal surface of the dielectric layer was set at 1000, the total area of the insulation patch members was set at 1100000 µm$^2$, and the closest distance between insulation patch members was set at 100 µm. The measurement of the capacitance values and the insulation resistance values and the evaluation of aged deterioration were performed on electronic device sheet elements under the same evaluation conditions as in Example 1. As a result, conforming items were obtained at 90% (90/100 pcs) after 600 hours.

Example 11

An electronic device sheet was manufactured by the same manufacturing method as in Example 7 except that the number of insulation patch members per 1 cm$^2$ of the principal surface of the dielectric layer was set at 700, the total area of the insulation patch members was set at 1200000 µm$^2$, and the closest distance between insulation patch members was set at 6000 µm. The measurement of the capacitance values and the insulation resistance values and the evaluation of aged deterioration were performed on electronic device sheet elements under the same evaluation conditions as in Example 1. As a result, conforming items were obtained at 83% (83/100 pcs) after 600 hours.

Example 12

An electronic device sheet was manufactured by the same manufacturing method as in Example 7 except that the number of insulation patch members per 1 cm$^2$ of the principal surface of the dielectric layer was set at 7, the total area of the insulation patch members was set at 1200000 µm$^2$, and the closest distance between insulation patch members was set at 6000 µm. The measurement of the capacitance values and the insulation resistance values and the evaluation of aged deterioration were performed on electronic device sheet elements under the same evaluation conditions as in Example 1. As a result, conforming items were obtained at 82% (82/100 pcs) after 600 hours.

Example 13

An electronic device sheet was manufactured by the same manufacturing method as in Example 7 except that the number of insulation patch members per 1 cm$^2$ of the principal surface of the dielectric layer was set at 800, the total area of the insulation patch members was set at 1200000 µm$^2$, the closest distance between insulation patch members was set at 6000 µm, and no nucleus portion was formed. The measurement of the capacitance values and the insulation resistance values and the evaluation of aged deterioration were performed on electronic device sheet elements under the same evaluation conditions as in Example 1. As a result, conforming items were obtained at 76% (76/100 pcs) after 600 hours.

Example 14

An electronic device sheet was manufactured by the same manufacturing method as in Example 13 except that the number of insulation patch members per 1 cm$^2$ of the principal surface of the dielectric layer was set at 1000, the total area of the insulation patch members was set at 1200000 µm$^2$, and the closest distance between insulation patch members was set at 6000 µm. The measurement of the capacitance values and the insulation resistance values and the evaluation of aged deterioration were performed on electronic device sheet elements under the same evaluation conditions as in Example 1. As a result, conforming items were obtained at 74% (74/100 pcs) after 600 hours.

Example 15

An electronic device sheet was manufactured by the same manufacturing method as in Example 13 except that the number of insulation patch members per 1 cm$^2$ of the principal surface of the dielectric layer was set at 6, the total area of the insulation patch members was set at 1200000 µm$^2$, and the closest distance between insulation patch members was set at 6000 µm. The measurement of the capacitance values and the insulation resistance values and the evaluation of aged deterioration were performed on electronic device sheet elements under the same evaluation conditions as in Example 1. As a result, conforming items were obtained at 75% (75/100 pcs) after 600 hours.

Example 16

An electronic device sheet was manufactured by the same manufacturing method as in Example 13 except that the number of insulation patch members per 1 cm$^2$ of the principal surface of the dielectric layer was set at 900, the total area of the insulation patch members was set at 1200000 µm$^2$, and the closest distance between insulation patch members was set at 6000 µm. The measurement of the capacitance values and the insulation resistance values and the evaluation of aged deterioration were performed on electronic device sheet elements under the same evaluation conditions as in Example 1. As a result, conforming items were obtained at 73% (73/100 pcs) after 600 hours.

Example 17

An electronic device sheet was manufactured by the same manufacturing method as in Example 7 except that the number of insulation patch members per 1 cm² of the principal surface of the dielectric layer was set at 1, the total area of the insulation patch members was set at 1200000 μm², and the closest distance between insulation patch members was set at 7000 μm. The measurement of the capacitance values and the insulation resistance values and the evaluation of aged deterioration were performed on electronic device sheet elements under the same evaluation conditions as in Example 1. As a result, conforming items were obtained at 63% (63/100 pcs) after 600 hours.

Comparative Example 1

An electronic device sheet was manufactured by the same manufacturing method as in Example 13 except that the number of insulation patch members per 1 cm² of the principal surface of the dielectric layer was set at 3, the total area of the insulation patch members was set at 8 μm², and the closest distance between insulation patch members was set at 6000 μm. The measurement of the capacitance values and the insulation resistance values and the evaluation of aged deterioration were performed on electronic device sheet elements under the same evaluation conditions as in Example 1. As a result, conforming items were obtained only at 7% (7/100 pcs) after 600 hours. This is considered due to the influence of the occurrence of a short circuit or a leakage current resulting from too long a distance between insulation patch members, which makes the insulation patch members difficult to act collaboratively.

Comparative Example 2

An electronic device sheet was manufactured by the same manufacturing method as in Example 13 except that the number of insulation patch members per 1 cm² of the principal surface of the dielectric layer was set at 100, the total area of the insulation patch members was set at 3004000 μm², and the closest distance between insulation patch members was set at 82 μm. The measurement of the capacitance values and the insulation resistance values and the evaluation of aged deterioration were performed on electronic device sheet elements under the same evaluation conditions as in Example 1. As a result, conforming items were obtained only at 5% (5/100 pcs) after 600 hours. This is considered due to the influence of the occurrence of a short circuit or a leakage current resulting from too long a distance between insulation patch members, which makes the insulation patch members difficult to act collaboratively.

Comparative Example 3

An electronic device sheet was manufactured by the same manufacturing method as in Example 13 except that the number of insulation patch members per 1 cm² of the principal surface of the dielectric layer was set at 1100, the total area of the insulation patch members was set at 2000000 μm², and the closest distance between insulation patch members was set at 70 μm. The measurement of the capacitance values and the insulation resistance values and the evaluation of aged deterioration were performed on electronic device sheet elements under the same evaluation conditions as in Example 1. As a result, conforming items were obtained only at 4% (4/100 pcs) after 600 hours. This is considered due to the influence of the occurrence of dielectric breakdown resulting from an increase in the total amount of stresses and charges accumulating in a large number of insulation patch members, which makes the existence of large energy induce a rapid release.

Comparative Example 4

An electronic device sheet was manufactured by the same manufacturing method as in Example 13 except that the number of insulation patch members per 1 cm² of the principal surface of the dielectric layer was set at 800, the total area of the insulation patch members was set at 4000000 μm², and the closest distance between insulation patch members was set at 70 μm. The measurement of the capacitance values and the insulation resistance values and the evaluation of aged deterioration were performed on electronic device sheet elements under the same evaluation conditions as in Example 1. As a result, conforming items were obtained only at 3% (3/100 pcs) after 600 hours. This is considered due to the influence of the occurrence of dielectric breakdown resulting from an increase in the total amount of stresses and charges accumulating in a large number of insulation patch members, which makes the existence of large energy induce a rapid release.

Comparative Example 5

An electronic device sheet was manufactured by the same manufacturing method as in Example 1 except that no insulation patch members were formed, and no nucleus portion was formed. The measurement of the capacitance values and the insulation resistance values and the evaluation of aged deterioration were performed on electronic device sheet elements under the same evaluation conditions as in Example 1. As a result, conforming items was obtained only at 1% (1/100 pcs) after 600 hours. This is considered due to the influence of the occurrence of dielectric breakdown resulting from the absence of insulation patch members, which makes the existence of large energy induce a rapid release.

The above-described series of Examples and Comparative Examples will be summarized in Table 1.

TABLE 1

| | Condition | | | | | Result |
|---|---|---|---|---|---|---|
| | Number of insulation patch members (number) | Total area of insulation patch members (μm²) | Nucleus portion present? | Closest distance between insulation patch members (μm) | Manufacturing method of insulation patch members | Reliability Conforming item rate (600 hrs) |
| Example 1 | 4 | 120 | Present | 5000 | Discharging | 92/100 pcs |
| Example 2 | 6 | 1000 | Present | 4000 | Discharging | 93/100 pcs |
| Example 3 | 10 | 3000 | Present | 3000 | Discharging | 97/100 pcs |
| Example 4 | 16 | 5000 | Present | 2500 | Discharging | 99/100 pcs |
| Example 5 | 25 | 10000 | Present | 2000 | Discharging | 96/100 pcs |
| Example 6 | 44 | 20000 | Present | 1500 | Discharging | 93/100 pcs |
| Example 7 | 100 | 100000 | Present | 1000 | Mask sputtering | 94/100 pcs |

TABLE 1-continued

| | Condition | | | | | |
|---|---|---|---|---|---|---|
| | Number of insulation patch members (number) | Total area of insulation patch members (μm²) | Nucleus portion present? | Closest distance between insulation patch members (μm) | Manufacturing method of insulation patch members | Result Reliability Conforming item rate (600 hrs) |
| Example 8 | 400 | 500000 | Present | 500 | Mask sputtering | 91/100 pcs |
| Example 9 | 1000 | 800000 | Present | 150 | Mask sputtering | 90/100 pcs |
| Example 10 | 1000 | 1100000 | Present | 100 | Mask sputtering | 90/100 pcs |
| Example 11 | 700 | 1200000 | Present | 60 | Mask sputtering | 83/100 pcs |
| Example 12 | 7 | 1200000 | Present | 60 | Mask sputtering | 82/100 pcs |
| Example 13 | 800 | 1200000 | Absent | 60 | Mask sputtering | 76/100 pcs |
| Example 14 | 1000 | 1200000 | Absent | 60 | Mask sputtering | 74/100 pcs |
| Example 15 | 6 | 1200000 | Absent | 60 | Mask sputtering | 75/100 pcs |
| Example 16 | 900 | 1200000 | Absent | 60 | Mask sputtering | 73/100 pcs |
| Example 17 | 1 | 1200000 | Absent | 6000 | Mask sputtering | 63/100 pcs |
| Comparative Example 1 | 2 | 8 | Absent | 7000 | Mask sputtering | 7/100 pcs |
| Comparative Example 2 | 100 | 3004000 | Absent | 82 | Mask sputtering | 5/100 pcs |
| Comparative Example 3 | 1100 | 2000000 | Absent | 70 | Mask sputtering | 4/100 pcs |
| Comparative Example 4 | 800 | 4000000 | Absent | 70 | Mask sputtering | 3/100 pcs |
| Comparative Example 5 | 0 | — | Absent | — | — | 1/100 pcs |

Through the Examples and the Comparative Examples, the present inventors confirmed that the electronic device sheet in the present embodiment precludes dielectric breakdown, and therefore is excellent in durability.

What is claimed is:

1. An electronic device sheet, comprising
a pair of electrode layers, a dielectric layer provided between the pair of electrode layers, and one or more insulation patch members provided on one of principal surfaces of the dielectric layer, wherein
a number of the insulation patch members is 1 to 1000 per 1 cm² of the principal surface,
a total area of the insulation patch members is 10 μm² to 3 mm² per 1 cm² of the principal surface, and the principal surface includes thereon two or more of the insulation patch members, and a closest distance between the insulation patch members is 100 μm to 5 mm.

2. The electronic device sheet according to claim 1, wherein the dielectric layer includes a nucleus portion, and the nucleus portion is covered with the insulation patch member.

3. The electronic device sheet according to claim 2, wherein the nucleus portion is a recessed portion or a projecting portion on a surface of the dielectric layer, or a hole penetrating the dielectric layer.

* * * * *